United States Patent
Wisley et al.

(10) Patent No.: US 10,829,901 B2
(45) Date of Patent: Nov. 10, 2020

(54) SYSTEM FOR DETERMINING COMPACTION OF A TERRAIN BASED ON ROLLING RESISTANCE

(71) Applicant: Caterpillar SARL, Geneva (CH)

(72) Inventors: David Wisley, Peterborough (GB);
Michael Looney, Peterborough (GB);
Russell Pugh, Peterborough (GB);
Rodney Menold, Peterborough (GB);
Jonathan Moses, Peterborough (GB);
Tom Abel, Peterborough (GB);
Anthony Weltzer, Peterborough (GB);
Stephen Thompson, Peterborough (GB)

(73) Assignee: Caterpillar SARL, Geneva (CH)

( * ) Notice: Subject to any disclaimer, the term of this patent is extended or adjusted under 35 U.S.C. 154(b) by 76 days.

(21) Appl. No.: 15/840,625

(22) Filed: Dec. 13, 2017

(65) Prior Publication Data
US 2018/0179719 A1  Jun. 28, 2018

(30) Foreign Application Priority Data
Dec. 23, 2016  (GB) .................................. 1622081.6

(51) Int. Cl.
*E02D 1/02* (2006.01)
*E02F 9/26* (2006.01)
*B60W 40/10* (2012.01)
*E02F 9/20* (2006.01)

(52) U.S. Cl.
CPC ......... *E02D 1/022* (2013.01); *B60W 40/1005* (2013.01); *E02F 9/261* (2013.01); *E02F 9/264* (2013.01); *E02F 9/2045* (2013.01)

(58) Field of Classification Search
CPC .... E02D 1/022; B60W 40/1005; E02F 9/261; E02F 9/264; E02F 9/2045; G06T 7/0008; G01N 9/36; E01C 23/07; E01C 19/004
See application file for complete search history.

(56) References Cited

U.S. PATENT DOCUMENTS

| | | | |
|---|---|---|---|
| 6,188,942 B1 * | 2/2001 | Corcoran .............. | E01C 19/006 701/408 |
| 8,467,943 B2 * | 6/2013 | Dersjo .................. | B60W 30/18 701/468 |
| 9,011,038 B2 * | 4/2015 | Buschmann ............ | E01C 19/00 404/101 |
| 9,423,332 B2 * | 8/2016 | Corcoran ................ | G01N 9/36 |
| 2007/0239338 A1 * | 10/2007 | Potts ...................... | E01C 19/288 701/50 |

(Continued)

*Primary Examiner* — Harshad R Patel
*Assistant Examiner* — Nigel H Plumb

(57) ABSTRACT

Disclosed herein is a system and method for determining the compaction of terrain based on rolling resistance. The system comprises a work machine configured to move along a route along the terrain, a navigation system configured to generate route data indicative of the route, a sensor configured to generate operating parameter data indicative of an operating parameter of the work machine moving along the route, and a processing unit. The processing unit is configured to process the operating parameter data to generate rolling resistance data indicative of the resistance by the terrain to the movement of the work machine along the route, and to process the rolling resistance data to generate compaction data indicative of the compaction of the terrain along the route.

18 Claims, 3 Drawing Sheets

(56) References Cited

U.S. PATENT DOCUMENTS

2010/0131122 A1    5/2010  Dersjoe
2014/0348587 A1*  11/2014  Corcoran ................ E01C 19/26
                                                    404/84.05
2015/0260626 A1*   9/2015  Frelich ...................... G01P 3/00
                                                    404/84.05
2016/0168806 A1*   6/2016  Corcoran ............. E01C 19/288
                                                    701/50
2016/0222602 A1*   8/2016  Downing .............. E01C 19/004
2016/0237630 A1*   8/2016  Aho ........................ E01C 19/23
2016/0292846 A1*  10/2016  Sprock ................... G05B 19/00

* cited by examiner

SYSTEM FOR DETERMINING COMPACTION OF A TERRAIN BASED ON ROLLING RESISTANCE

CLAIM FOR PRIORITY

This application claims benefit of priority of UK Patent Application No. 1622081.6 filed Dec. 23, 2016, which is incorporated herein by reference.

TECHNICAL FIELD

The present disclosure relates to a method for determining the compaction of a terrain of a worksite and systems for performing such a method.

BACKGROUND

The variation of the terrain of a worksite, such as a construction site, mine, quarry, waste dump, aggregate site or the like, may affect the efficiency of the operation of any work machines operating on the worksite. Such work machines may include hauling machines, such as dump trucks, off-highway trucks, on-highway lorries/trucks, mining trucks, articulated haulers, earth-moving machines, such as backhoes, loaders, dozers, shovels, motor graders, wheel tractor scrapers, excavators and the like. In particular, the different gradients and type of terrain, such as soil, sand, waste, aggregate and the like, may affect operation of the machines and in some cases may result in the operation of the work machine being less efficient in some areas of the worksite.

U.S. Pat. No. 8,467,943 discloses a method of controlling a work machine during a work cycle between loading and unloading positions. In particular, a transmission of the work machine may be controlled based upon the variation of at least one condition that varies in the course of the work cycle. The at least one condition variation may be associated with the variation of work machine operational characteristics and a sequence of condition variation events may be built up in response to the experienced driving pattern along the work cycle route. However, the U.S. Pat. No. 8,467,943 concerns the operation of a single machine working on a work cycle route and does not disclose how the operational characteristics can be used in order to improve efficiency across the entire worksite.

SUMMARY

The present disclosure provides for determining the compaction of a terrain of a worksite. At least one work machine is moved along a route over the terrain; generating route data indicative of the route. Operating parameter data indicative of at least one operating parameter of the at least one work machine is determined as the machine moves along the route. The operating parameter data to is used generate rolling resistance data indicative of the resistance of the terrain to the movement of the at least one work machine as it moves along the route. The rolling resistance data is processed to generate compaction data indicative of the compaction of the terrain along the route.

The present disclosure further provides a system for determining the compaction of a terrain of a worksite, the system comprises at least one work machine that is configured to move along a route over the terrain, a navigation system configured to generate route data indicative of the route taken by the machine, at least one sensor configured to sense operating parameter data indicative of at least one operating parameter of the at least one work machine as it is moving along the route and a processing unit configured to: process the operating parameter data to generate rolling resistance data indicative of the resistance by the terrain to the movement of the at least one work machine along the route and to process the rolling resistance data to generate compaction data indicative of the compaction of the terrain along the route.

BRIEF DESCRIPTION OF DRAWINGS

The present disclosure is described in conjunction with the appended figures. It is emphasized that, in accordance with the standard practice in the industry, various features are not drawn to scale. In fact, the dimensions of the various features may be arbitrarily increased or reduced for clarity of discussion.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
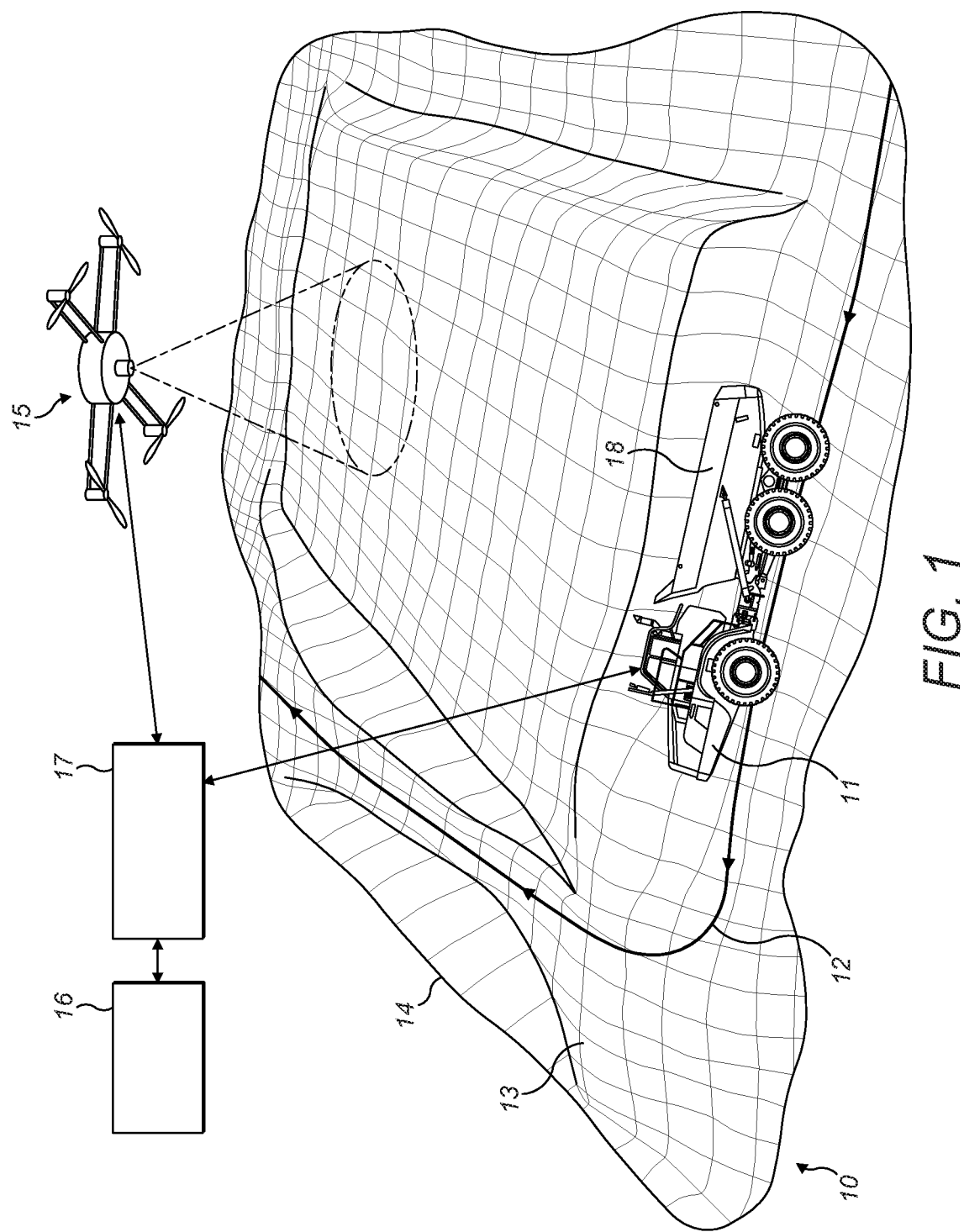
FIG. 1 illustrates an exemplary system of the present disclosure.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention, it being understood that various changes may be made in the function and arrangement of elements, including combinations of features from different embodiments, without departing from the scope of the invention.

Specific details are given in the following description to provide a thorough understanding of the embodiments. However, it will be understood by one of ordinary skill in the art that embodiments may be practised without these specific details. For example, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The present disclosure generally relates to methods, systems and apparatuses for determining the compaction of the terrain of a worksite. At least one work machine may move along a route and its position may be tracked. On-board sensors may assess the resistance to the movement of the at least one work machine resulting from the terrain. This rolling resistance may subsequently be processed to obtain data indicative of the compaction of the terrain along the route. The compaction data may subsequently be processed for controlling the operation of at least one work machine or processed to determine at least one operating condition of the at least one work machine or worksite.

FIG. 1 illustrates an embodiment of a system 10 of the present disclosure comprising at least one work machine 11 moving along a route 12 over a terrain 13 of a worksite 14. The system 10 may further comprise at least one surveying device 15, an external control system 16 and a communication system 17.

The worksite 14 may comprise an area in which earth or other material is moved and/or manipulated and may be an off-road area. The illustrated worksite 14 is a mine, although in other embodiments the worksite 14 may comprise a construction site, mine, quarry, waste dump site, aggregate site or the like. The terrain 13 may comprise the ground of the worksite 14 over which the work machine 11 travels and the route 12 may comprise the path of the work machine 11 over the terrain 13. The route 12 may comprise a path from a first location to a second location.

The work machine 11 may be any type of work machine 11, particularly a hauling machine or material handling machine, suitable for the worksite 14 and the system 10 may comprise a plurality of different work machines 11. The illustrated work machine 11 is an articulated hauler, although in other embodiments the work machine(s) 11 may comprise any other type of hauling machine, such as dump trucks, off-highway trucks, on-highway lorries, mining trucks, and articulated haulers, and/or material handling machine, such as backhoes, loaders, dozers, shovels, wheel tractor scrapers, drilling machines, motor graders, forestry machines and excavators. A hauling machine may be a work machine 11 configured predominantly for transporting bulk material. A material handling machine may be a work machine 11 configured to perform work on the terrain 13 of the worksite 14.

The material handling machine work may perform generally local work on a relatively small area of the terrain 13, such as digging or drilling, and may be differentiated from the work performed by a hauling machine, in which bulk material is transported over a relatively large distance. Although at least one compaction machine may be present on the worksite 14, the at least one work machine 11 of the present disclosure may not comprise a compaction machine. In particular, a compaction machine may be considered to be a machine dedicated to compacting a terrain, such as a compactor, motorgrader, heavy soil compaction equipment and pneumatic, oil or vibratory rollers. The at least one work machine 11 may not be dedicated to compaction and may instead be dedicated to material handling or material hauling. Use of at least one material handling machine may give compaction information across the worksite 14 and/or additional compaction information that may be combined with data from at least one compaction machine. Moreover, the different operating characteristics of the at least one compaction machine and the at least one material handling machine may provide that the combination of data from the two types of machine may produce a more accurate and/or more wide ranging compaction determination. For example, anomalies in compaction readings from two different types of machine may produce information about compaction and/or different modelling processes for the two types of machine may mean that more complete/accurate compaction data may be obtained from two different types of machines.

If the work machine 11 comprises a hauling machine the first location may be a location on the worksite 14 at which the hauling machine is loaded with material and the second location may be a location on the worksite 14 at which the hauling machine ejects the material. The route 12 may therefore be a "haul route" and the at least one work machine 11 may travel over the haul route a plurality of times in order to transfer a plurality of loads of material between the first and second locations. If the work machine 11 comprises a material handling machine the first location may be the location at which the work machine 11 picks up material from the terrain 13 and the second location may be the location at which the earth-moving machine deposits the material into a hauling machine. A haul route may be a route 12 between at least one loading location and at least one ejection location. Alternatively, the material handling machine may also travel along the haul route, for example between a first location, at which the material handling may be parked or stored when not in use, and a second location, where the material handling machine may perform work.

The at least one work machine 11 may comprise an engine system configured to drive at least one ground engaging arrangement to move the at least one work machine 11 along the route 12. The at least one ground engagement member may comprise at least one wheel, tracks or the like. The engine system may comprise at least one power unit (e.g. an internal combustion engine, electric motor and/or hydraulic motor) configured to drive a powertrain. The powertrain may comprise at least one transmission configured to drive at least one output shaft or the like for driving the at least one ground engagement member.

The work machine 11 may comprise at least one work tool 18 for performing work on the worksite 14. The form of the at least one work tool 18 may depend upon the type of the work machine 11. In the case of a hauling machine the at least one work tool 18 may comprise a dump body or other arrangement for holding bulk material during transportation. The dump body may be pivotable to allow ejection of the material or may comprise an actuatable ejector member within the dump body to enable ejection of the material. In the case of a material handling machine, the at least one work tool 18 may be of any suitable type for digging, lifting or otherwise manipulating material of the worksite 14, such as a bucket, shovel, conveyor or the like.

Figure 2:
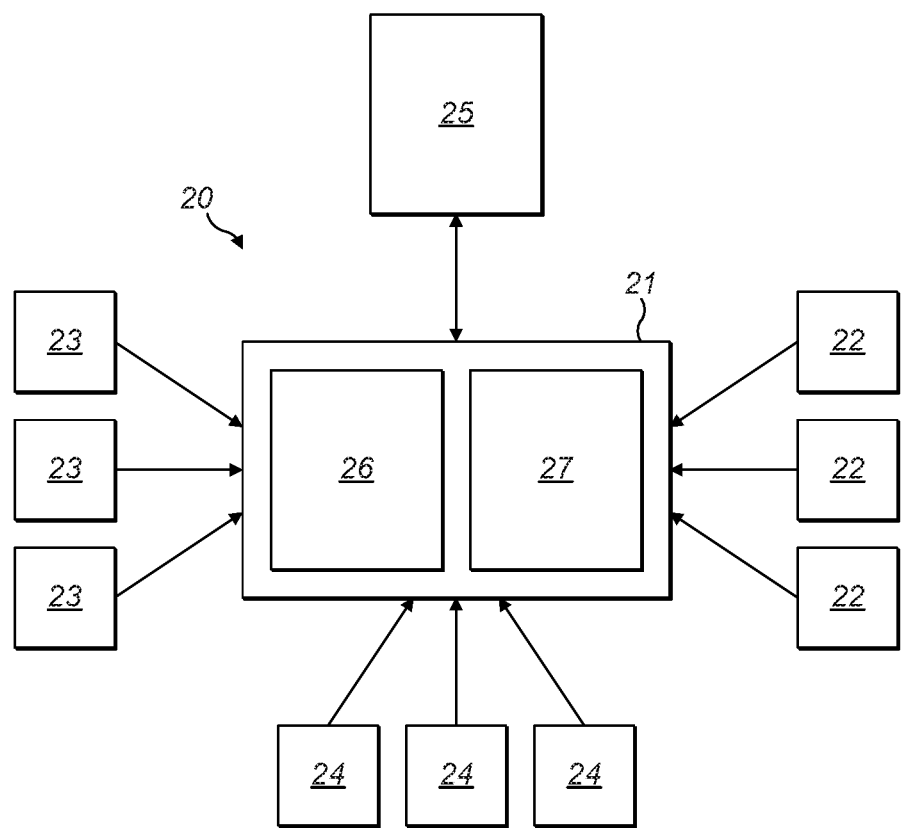
FIG. 2 illustrates an exemplary machine control system of a work machine of the system of FIG. 1.

The at least one work machine 11 may comprise a machine control system 20 as schematically illustrated in FIG. 2. The machine control system 20 may be configured to perform the method of the present disclosure. The machine control system 20 may comprise a controller 21 communicatively connected (via a wired or wireless connection) to at least one input 22, at least one output 23, at least one sensor 24 and at least one machine communication module 25. The controller 21 may be of any suitable known type and may comprise an engine control unit (ECU) or the like. The controller 21 may comprise a memory 26, which may store instructions or algorithms in the form of data, and a processing unit 27, which may be configured to perform operations based upon the instructions. The memory 26 may comprise any suitable computer-accessible or non-transitory storage medium for storing computer program instructions, such as RAM, SDRAM, DDR SDRAM, RDRAM, SRAM, ROM, magnetic media, optical media and the like. The processing unit 27 may comprise any suitable processor capable of executing memory-stored instructions, such as a microprocessor, uniprocessor, a multiprocessor and the like. The controller 21 may further comprise a graphics processing unit for rendering objects for viewing on a display.

The controller 21 may receive data from at least one input 22, at least one sensor 24 and/or the machine communication module 25 and perform operations based upon the instructions, such as by sending data to an output 23, at least one sensor 24 and/or the machine communication module 25, performing calculations or carrying out logic-based tasks. The at least one input 22 may comprise a device for operation by, or receiving at least one input signal from, an operator for controlling the at least one work machine 11, such as a gear selector, a steering wheel, a brake pedal, a speed selector (e.g. an accelerator pedal), a work tool 18 manipulator (e.g. a joystick), a dashboard button and the like. The at least one input 22 may relate to at least one operating condition of the at least one work machine 11, such as a gear selection, movement of the steering wheel, a braking command, a speed command, a work tool 18 manipulation, a button press or the like.

The at least one output 23 may comprise a device for operating the at least one work machine 11 in accordance with at least one operating condition. Exemplary outputs 23 include the transmission, the engine or any part thereof, a valve system, a fuel injection system, an electric, pneumatic and/or hydraulic system for controlling the work machine 11 and/or at least one work tool 18 (particularly a dump body, ejector body or conveyor), a steering mechanism, brake actuators, a differential lock, a display for displaying information to an operator, lights and the like. The at least one operating condition implemented by the at least one output 23 may be any type of operating condition of the work machine 11, such as, for example, a machine speed, a direction of travel, an engine speed, a powertrain load, a braking or retarding load, gear selection or transmission ratio, work tool 18 positioning, work tool 18 manipulation (e.g. opening or closing shears, as bucket and the like), a payload measurement (e.g. the load caused by material in a dump body, bucket or the like), fluid pressure in hydraulic circuits (e.g. for controlling the work tool 18), electric current or voltage levels and the like.

The at least one sensor 24 may comprise any device configured to determine and monitor at least one actual operating condition of the work machine 11 and generate data indicative of the at least one actual operating condition. The at least one actual operating condition may comprise at least one operating condition as described above or indicative of the state of the work machine 11 or a component, system or subsystem thereof. For example, the at least one sensor 24 may be configured to sense operation of at least one input 22 or the effect of the operation of at least one output 23.

The at least one sensor 24 may comprise an inclination sensor to determine the three-dimensional inclination of the work machine 11 on the terrain 13 and generate inclination data indicative of the inclination. The at least one sensor 24 may comprise a dump body monitor to determine the status of the dump body. In particular, the dump body monitor may comprise an inclination sensor for measuring the inclination of a pivotable dump body, a position sensor for determining the position of an ejector member of a dump body with an ejector and/or a load sensor for determining the load of material, if any, in the dump body. The at least one sensor 24 may comprise at least one engine output speed sensor for detecting the rotational velocity of at least one output shaft from the engine.

The system 10 may further comprise a navigation system for determining the position of the at least one work machine 11 and generating actual machine position data indicative of its position on the worksite 14. The navigation system may determine the location of the at least one work machine 11 on the Earth's surface and/or may determine the location of the at least one work machine 11 relative to a reference position on the worksite 14. The actual machine position data may comprise the position of the work machine 11 in two dimensional coordinates X, Y representing its position on a plane parallel to the surface of the worksite 14. The actual machine position data may also comprise a third dimensional coordinate Z indicative of the "height" of the machine relative to a reference height. The actual machine position data may comprise a plurality of coordinates indicating the position of the at least one work machine 11 as it moves over the terrain 13 and the plurality of coordinates may define the route 12. The plurality of coordinates may be generated by sampling the position of the at least one work machine 11 at time intervals.

The navigation system may comprise any suitable navigation system. In particular, the at least one sensor 24 may comprise a position sensor operable to determine the position of the work machine 11 via a global navigation satellite system, such as global positioning system (GPS), or via triangulation with communication masts. Alternatively, the navigation system may be embodied in the machine control system 20, which may substantially continuously monitor at least the speed and direction of the work machine 11 as it moves over the worksite 14 between a first and second location. The coordinates of the first location may be input into the machine control system 20 and stored on the memory 26. Based upon the monitored speed and direction of the work machine 11 the machine control system 20 may be operable to determine the coordinates of the second location.

The machine communication module 25 may be configured to transfer data between the machine control system 20 and an external communication system 17 of the system 10, an external control system 16 of the system 10, the navigation system and/or the machine control system 20 of another work machine 11. The communication may comprise any suitable method for communication therebetween, particularly a wireless or wired network. Exemplary wireless networks include a satellite communication network, broadband communication network, cellular, Bluetooth, microwave, point-to-pint wireless, point-to-multipoint wireless, multipoint-to-multipoint wireless, Wireless Local Service (WiFi Dongle), Dedicated Short-Range Communications (DSRC) or any other wireless communication network. Exemplary wired networks include Ethernet, fibre optic, waveguide or any other suitable wired connection.

The data collected by the machine control system 20 may be transferred to the external control system 16, which may perform the method of the present disclosure. Therefore, any description of the operation of the system 10 in the present disclosure with reference to the machine control system 20 may be considered to equally apply to the external control system 16 performing the method. The external control system 16 may be a computer system and may comprise any known computer system, such as a personal computer, laptop, tablet computer, server, smartphone and the like. The external control system 16 may be separate from the work machine 11 they may communicate data within one another via the external communication system 17 and machine communication module 25. The external control system 16 may be located in a monitoring station on the worksite 14 or at a station remote to the worksite 14. For example, the external control system 16 may be located in a central server and database of the operating company of the worksite 14 and/or the at least one work machine 11. Alternatively, the external control system 16 may be located on the at least one work machine 11, but be substantially separate from the machine control system 20.

INDUSTRIAL APPLICATION

Figure 3:
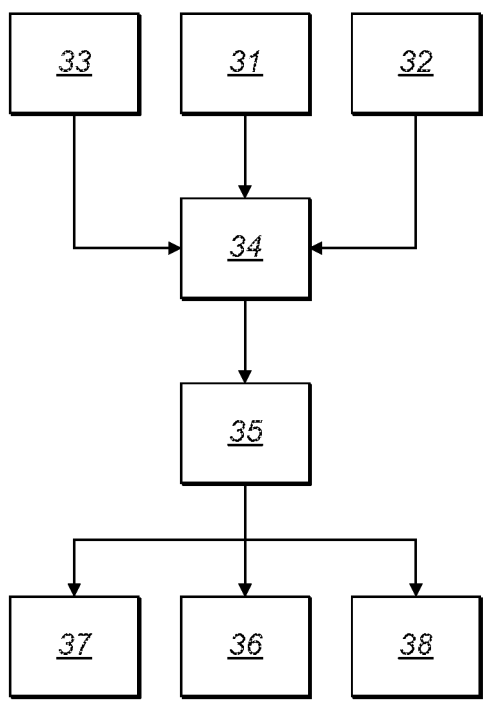
FIG. 3 is a flow diagram of the method of operating the system of the present disclosure.

An exemplary method 30 of operating the system 10 of the present disclosure is schematically illustrated in FIG. 3. The method 30 may comprise a machine operation step 31, a monitoring step 32, a route determination step 33, a rolling resistance calculation step 34, compaction determination step 35, mapping step 36, communication step 37 and/or a machine control step 38.

During the machine operation step 31 the at least one work machine 11 may be operated to travel along the route 12. The at least one work machine 11 may be operated by a human operator (i.e. manually), semi-autonomously or autonomously. The at least one work machine 11 may be operated in accordance with at least one operating parameter, which may be at least one of:

A power unit output torque, which may be the output torque of the at least one power unit of the at least one work machine 11;

A machine speed, which may be the speed of the at least one work machine 11 moving along the route 12;

A machine direction, which may be the direction of travel of the at least one work machine 11 as it moves along the route 12;

A machine inclination, which may be the inclination of the work machine 11 on the terrain 13 relative to the direction of gravity in two or three dimensions (e.g. front to back and/or side-to-side inclination);

A machine position, which may be the position of the at least one work machine 11 at a point in time as it moves along the route 12;

A work tool position, which may be the position and/or orientation of the at least one work tool 18, for example a dump body, relative to the direction of gravity and/or the at least one work machine 11;

An engine rotating speed, which may be the rotational velocity of at least one output shaft of the engine of the at least one work machine 11; and/or A machine payload, which may be the load or weight of the at least one work machine 11 and any material being transported by the at least one work machine 11, such as in a dump body or the like.

During the monitoring step 32 the external or machine control system 16, 20 may monitor the at least one operating parameter as the at least one work machine 11 is operated in accordance with the machine operation step 31. In particular, the controller 21 may receive operating parameter data from, and thereby monitor, the at least one sensor 24, at least one input 22 and/or navigation system. The operating parameter data may be indicative of at least one of the machine speed, direction, inclination, position and payload. The external or machine control system 16, 20 may continuously receive operating parameter data indicative of the at least one operating parameter or it may sample operating parameter data at time periods.

During the route determination step 33 the system 10 may determine route data indicative of the route 12 of the at least one work machine 11 during the machine operation step 31. The external or machine control system 16, 20 may also associate the operating parameter data received with the route 12 such that the operating parameter data may be associated with a certain position on the route 12. The machine position data from the navigation system may be utilised to create route data representing a map, in two or three dimensions, of the route 12. Alternatively, the total distance of the route 12 may be determined, such as by utilising machine speed data and the time taken to travel the route 12, such that the operating parameter data may be associated with the distance travelled along the route 12 (for example as a percentage of the total route 12 travelled). As a result a graph of operating parameter data can be plotted against the distance travelled.

During the rolling resistance calculation step 34 the external or machine control system 16, 20 may process the operating parameter data received at during the monitoring step 32 and determine the rolling resistance of the at least one work machine 11. The rolling resistance may be calculated a plurality of times along a plurality of positions of the route 12 or continuously in order to generate rolling resistance data. The rolling resistance data may be unitless. The method 30 of the present disclosure may therefore be directed to determining the variation of the rolling resistance rather than and actual rolling resistance value.

A coefficient of rolling resistance $C_{rr}$ may be calculated based upon the driving force Fdrive of the at least one work machine 11 and accounting for losses during the movement of the at least one work machine 11. The losses may include the aerodynamic drag Fdrag on the at least one work machine 11 and an inclination force Fgrade acting on the at least one work machine. Inertial losses Facc during any acceleration of the at least one work machine 11 may also be accounted for. Crr may be determined via the equation:

$$Crr=(Fdrive-Fgrade-Fdrag-Facc)/(m \times g)$$

Crr may be converted into a percentage RR. m may be the machine payload, which may include the weight of the at least one work machine and any material thereon. g is the gravity of Earth. Fgrade may be calculated based upon the inclination angle a of the terrain 13, which may be determined from at least one inclination sensor, and utilising the equation:

$$Fgrade=m \times g \times \sin(a)$$

Fdrag may be estimated based upon the machine speed and a known frontal area of the at least one work machine 11. The memory 26 may store data relating to the frontal area of at least one work machine 11 for retrieval by the external or machine control system 16, 20 for use in the calculation. Facc may be estimated based upon the acceleration of the at least one work machine 11 or the measured machine speed, which may be determined from an accelerometer thereon, and/or m.

Fdrive may be an estimation or calculation of the force applied by the at least one work machine 11 where the at least one ground engaging member contacts the terrain 13 in order to move the at least one work machine 11. Fdrive may be the rimpull force in the case of the at least one ground engaging member comprising a wheel or the drawbar force in the case of the at least one ground engaging member comprising tracks. The method of calculating or estimating Fdrive is well known in the art and, for example, may be determined from lookup tables stored on the memory 26 based upon operating parameter data. Alternative, Fdrive may be determined based upon an estimated driving torque driving the at least one ground engaging member and the known radius of the at least one ground engaging member. The estimated driving torque may be determined based upon an estimated engine output torque and a known transmission ratio across the powertrain. The estimated engine output torque may be determined using any method known in the art, particularly using the engine rotating speed. The engine output torque may also be estimated utilising the fuel rate and/or volume commanded for injection into the engine and a known fuel to engine output torque ratio.

During the compaction determination step 35 the rolling resistance data may be converted to compaction data indicative of the compaction of the terrain 13 along the route 12. In the present disclosure "compaction" may refer to the density or looseness of the material, such as soil, forming the terrain 13. A high compaction may indicate a high density and thus may indicate that the terrain 13 is relatively high hardness or low softness. A low compaction may indicate a low density and thus may indicate that the terrain 13 is a relatively low harness or high softness. A relatively high compaction may improve the load bearing capacity of the terrain 13 such that there is less resistance to the at least one work machine 11 travelling over the terrain 13. The rolling resistance is inversely proportional to the level of compaction. In the present disclosure the rolling resistance data may be converted to compaction data by inverting the compaction data. In particular, a compaction coefficient Cc=1/Crr and a compaction percentage CC=100−RR.

The rolling resistance data and/or compaction data may also be utilised in a soil elastic modulus (i.e. Young's modulus) calculation, which may also be based upon the depth of penetration of the at least one ground engaging member into the terrain 13. The depth of penetration may be estimated based upon properties of the at least one ground engaging member, such as the type of at least one ground engaging member (e.g. a radial or bias tyre, tracks or combination or track and tyres) and the hardness of the at least one ground engaging member (e.g. the pressure in the tyre, which may be monitored utilising at least one pressure sensor).

During the mapping step 36 map data may be generated by associating the rolling resistance and/or compaction data with the route data, such that the rolling resistance and/or compaction data is mapped to the route 12 and/or worksite 14. The rolling resistance and/or compaction data may be plotted in a graph against the distance travelled along the route 12 such that the variation in rolling resistance and/or compaction of the terrain 13 along the route 12 may be visualised. Alternatively, the rolling resistance and/or compaction data may be represented in a two or three dimensional map utilising the machine position data from the navigation system. It will be appreciated that the rolling resistance and/or compaction data may only be representative of the rolling resistance and/or compaction under the at least one ground engaging member of the at least one work machine 11, but that the at least one work machine 11 may overlie a larger area of the terrain 13 than the at least one ground engaging member. Therefore, each calculation of rolling resistance and compaction may be assigned as an average of the entire area of the terrain 13 under the at least one work machine 11 where the rolling resistance and compaction is determined. The rolling resistance and compaction between adjacent areas may be extrapolated to create an apparently smooth indication of the rolling resistance and compaction. The rolling resistance and compaction of the worksite 14 may be illustrated via a two or three dimensional colour or gradient map.

The rolling resistance and/or compaction data may be mapped to a blank map of the worksite 14 in which the surface profile of the worksite 14 is only indicated in the areas where rolling resistance data has been collected. However, the map may also include surface profile data indicative of the actual surface profile of the worksite 14. The surface profile data may be collected by an operator or from at least one surveying device 15 configured to measure the three-dimensional surface profile or topography of the worksite 14. The surface profile data may be determined in the form of a point cloud of the terrain 13 and may be processed, such as by extrapolation between points of a point cloud, to create a virtual map of the worksite 14. The at least one surveying device 15 may utilise any method, sensor, instrumentation or other apparatus known in the art to obtain the actual surface profile data, such as photogrammetry, radar, LIDAR, laser scanners, video systems, audio systems or a combination thereof. The at least one surveying device 15 may comprise a device separate from the at least one work machine 11, for example an aerial platform, such as a manned aircraft or unmanned aerial vehicle ("UAV"), or a terrestrial (i.e. land based) platform, such as a dedicated surface profile scanning vehicle (manned or unmanned). Alternatively, the at least one surveying device 15 may be partly or entirely embodied in the at least one work machine 11 (for example as a video recorder or image scanner). As a result, the map may illustrate the compaction in relation to variations of the height of the terrain 13.

Furthermore, in the mapping step 36 the rolling resistance and/or compaction data from a first route 12 may be incorporated into a map containing rolling resistance and/or compaction data from at least a second route 12, thereby forming a composite map. For example, if the system 10 comprises a plurality of work machines 11 travelling over a plurality of routes 12, rolling resistance data may be collected for each of the plurality of routes 12 and incorporated into the composite map. As a result, it may be possible to assemble a composite map of the compaction and/or rolling resistance of the worksite 14 in an area larger than just a single route 12.

During the communication step 37 the rolling resistance data, compaction data and/or map data may be communicated to an operator, the external control system 16 and/or at least one further work machine 11 via the external communication system 17. The data may be shown to an operator on the at least one work machine 11, a further at least one work machine 11 and/or an operator station within or external to the worksite 14. The data may be communicated between a plurality of work machines 11 in order to generate a composite map on one or more of the plurality of work machines 11. Furthermore, the data may be communicated to at least one compaction machine, as discussed in further detail below.

During the machine control step 38 at least one work machine 11, which may be the work machine 11 from which the rolling resistance data was obtained and/or at least one further work machine 11, and/or a compaction machine may be controlled based upon the rolling resistance data, compaction data and/or map data. The at least one work machine 11 and/or compaction machine may be manually controlled by an operator upon receiving an alert generated based upon the data. The at least one work machine 11 and/or compaction machine may also be automatically controlled (e.g. autonomously or semi-autonomously) by the machine control system 20 based upon the data.

The external or machine control system 16, 20 may be configured to process the rolling resistance data, compaction data and/or map data and identify compaction events. Compaction events may be identified at areas of the worksite 14 where the rolling resistance and/or compaction meets a compaction threshold. The compaction threshold may be stored on the memory 26 of the external or machine control system 16, 20. The compaction threshold may be a predetermined value of Cc, Crr, RR and/or CC at which the rolling resistance is determined to be too high, or the compaction too low, for efficient operation of the at least one work machine 11. The memory 26 may store a plurality of compaction thresholds and/or a plurality of compaction ranges indicative of a range of compaction thresholds. Each compaction threshold or range may be assigned to a level of severity of low compaction and the compaction events may be associated with at least one level of severity.

Upon identification of at least one compaction event, at least one work machine 11 and/or at least one compaction machine may be controlled to travel to the location of the compaction event and compact the terrain 13. Thus the system 10 may comprise a plurality of manually operated, semi-automated or automated compaction machines which may be dedicated to improving the compaction of routes 12.

A route 12 of at least one work machine 11 may be altered such that the at least one work machine 11 avoids the compaction event and travels over an area of the terrain 13 without a compaction event. Therefore, the operation of the at least one work machine 11 may be optimised to avoid areas of high rolling resistance. Alternatively, the external or machine control system 16, 20 may generate an alert to an operator or operate a work machine 11 to avoid the at least one compaction event if the work machine 11 is not suitable for compacting the terrain 13 around the compaction event. For example, if the external or machine control system 16, 20 determines that a hauling machine is carrying a payload above a payload threshold, the hauling machine may be directed to the compaction event to compact the terrain 13.

In the machine control step 38 the external or machine control system 16, 20 may be configured to determine a suitable tyre pressure value and/or range for at least one work machine 11, at least one ground engaging member of which is in the form of wheels with air pressurised tyres, based upon the rolling resistance data, compaction data and/or map data. At least one range and/or value of rolling resistance and/or compaction may be associated with at least one range and/or value of tyre pressures. The values and/or ranges may enable the optimisation of the tyre pressure to the compaction of the terrain 13. A range and/or value of a tyre pressure may be selected based upon the maximum or average rolling resistance and/or lowest compaction along a route 12 and/or the worksite 14. The external or machine control system 16, 20 may alert the operator to the suitable tyre pressure value and/or range and the operator may adjust at least one tyre pressure to be at the value or within the range. Alternatively, the at least one ground engaging member may comprise an automated tyre pressurisation system and the machine control system 20 may control the tyre pressurisation system to at least one tyre pressure to be at the value or within the range.

In the machine control step 38 at least one differential lock of the at least one work machine 11 may be controlled based upon the rolling resistance data and/or compaction data. In particular, the at least one differential lock may be locked, for example due to an operator input and/or automatic control by the machine control system 20, when the at least one work machine 11 travels over an area where the compaction level (i.e. Cc or CC) is below a compaction threshold and/or the rolling resistance level (i.e. Crr or RR) is above a rolling resistance threshold.

In the machine control step 38 the engine output torque of the at least one work machine 11 may be optimised based upon the rolling resistance data and/or compaction data. In particular, the engine output torque may be increased when the at least one work machine 11 travels over an area where the compaction level is below a compaction threshold and/or the rolling resistance level is above a rolling resistance threshold. The engine output torque may have a predefined relationship with the compaction level and/or rolling resistance level stored on the memory 26, such as by being proportional to one another. The engine output torque may thus be controlled based upon the relationship as the at least one work machine 11 travels over the varying compaction and/or rolling resistance levels of the terrain 13.

In the machine control step 38 the at least one work tool 18 may be controlled based upon the rolling resistance data and/or compaction data. The external or machine control system 16, 20 may generate an alert for an operator if an area is unsuitable for ejection of material from a hauling machine because the terrain 13 is too uncompact and soft. As a result, a hauling machine with a pivotable dump body may avoid pivoting the dump body in an area where tip-over may occur due to softness of the terrain 13. The pivoting speed, maximum angle and/or position of a pivotable dump body may be controlled based upon the compaction and/or rolling resistance levels. In particular, the pivoting speed and/or maximum angle may be reduced, or pivoting prevented entirely, when the at least one work machine 11 is located in an area of the terrain 13 where the compaction level is below a compaction threshold and/or the rolling resistance level is above a rolling resistance threshold. The positioning of an ejector body and/or speed of a conveyor may be similarly controlled.

In the machine control step 38 at least one work machine 11 and/or at least one compaction machine may be controlled to travel to the location of a compaction event and operate the at least one work tool 18 to adjust the compaction level of the terrain 13. In particular, a pivotable dump body, ejector dump body and/or conveyor may be controlled to eject material at an area where the compaction level is below a compaction threshold and/or the rolling resistance level is above a rolling resistance threshold. The at least one work machine 11 may also subsequently compact the area with the newly ejected material. Therefore, the compaction of the terrain 13 may be optimised.

The method 30 and system 10 of the present disclosure may significantly improve the efficiency of operation of at least one work machine 11 on the worksite 14. Work machines 11 may be operated to avoid areas of low compaction, thereby improving fuel efficiency. Furthermore, an operator at a worksite 14 can identify compaction levels that may not be visually identifiable, which may particularly be the case in waste sites, by viewing the generated maps of compaction data and/or rolling resistance. Furthermore, by utilising actual surface profile data obtained from at least one surveying device 15 the map visualisation may enable a more detailed analysis of the compaction of the worksite 14, such as by identifying links between compaction levels and certain inclinations or features of the worksite 14.

Although it is possible to determine the level of compaction of the terrain 13 using known laboratory and field tests, these tests may be cost and time expensive. The method 30 and system 10 may avoid the need to use such tests.

The method 30 and system 10 may enable the use of at least one work machine 11 that is not dedicated to compaction to identify compaction levels across a worksite 14 and adjust the compaction levels. Therefore, the system 10 may avoid the need to have dedicated compaction machines for determining the compaction. Furthermore, rolling resistance and compaction data may be collected by at least one work machine 11 as it carries out different tasks, such as material hauling or handling.

What is claimed is:

1. A method for determining the compaction of a terrain of a worksite using at least one work machine moving over the terrain, the method comprising:
   operating the at least one work machine to move along a route over the terrain;
   generating route data indicative of the route;
   generating operating parameter data indicative of at least one operating parameter of the at least one work machine moving along the route;
   processing the operating parameter data to generate rolling resistance data indicative of the resistance by the terrain to the movement of the at least one work machine along the route; and
   processing the rolling resistance data to generate compaction data indicative of the compaction of the terrain over which the work machine moves along the route, wherein the at least one work machine comprises a hauling machine or a material handling machine.

2. A method as claimed in claim 1, further comprising operating at least one work machine based upon the compaction data.

3. A method as claimed in claim 2, further comprising:
   processing the rolling resistance and/or compaction data to identify at least one compaction event, the at least one compaction event being identified where the compaction of the terrain meets a compaction threshold and/or falls within a compaction range;
   operating at least one work machine based upon the identification of at least one compaction event.

4. A method as claimed in claim 2, further comprising operating at least one work machine and/or a compaction machine to move along at least part of the route to adjust the compaction of the terrain of the route.

5. A method as claimed in claim 2, wherein the at least one work machine comprises at least one tyre and the method further comprises adjusting the air pressure of the at least one tyre based upon the compaction data.

6. A method as claimed in claim 2, wherein the at least one work machine comprises a pivotable dump body for ejecting material therefrom and the method further comprises processing the compaction data to identify at least one area of the worksite suitable for raising the pivoting the dump body and ejecting material.

7. A method as claimed in claim 1, further comprising the step of communicating the rolling resistance and/or compaction data to a further work machine from the work machine.

8. A method as claimed in claim 1, further comprising generating route data indicative of the route and processing the rolling resistance data, compaction data and/or route data to generate a map of the rolling resistance and/or compaction along the route.

9. A method as claimed in claim 8, further comprising generating compaction data from a plurality of work machines moving along a plurality of routes along the terrain and building a composite map indicative of the compaction of the terrain over the plurality of routes.

10. A method as claimed in claim 8, further comprising obtaining surface profile data indicative of the three-dimensional profile of the worksite and processing the surface profile data, compaction data and/or rolling resistance data to generate a topographical map of the worksite and compaction and/or rolling resistance.

11. A method as claimed in claim 8, further comprising displaying the map on a display.

12. A method as claimed in claim 1, wherein the rolling resistance is calculated based upon the driving force of the at least one work machine and accounting for at least one loss during the movement of the at least one work machine, wherein the at least one loss comprises at least one of aerodynamic drag, inclination force and inertial force.

13. A method as claimed in claim 1, wherein the compaction data generated by the hauling machine or the material handling machine is combined with compaction data generated by a compaction machine to process the compaction of the terrain.

14. A method as claimed in claim 1, wherein the route comprises at least one of a haul route between a loading location and an ejection location and a back-to-work route between a park location and a work location.

15. A method as claimed in claim 1, wherein the compaction data generated by the processing of the rolling resistance data comprises data indicative of looseness or density of soil forming the terrain.

16. A method as claimed in claim 1, wherein processing the rolling resistance data to generate compaction data indicative of the compaction of the terrain along the route comprises averaging the rolling resistance data to provide an average compaction data for an entire area of the terrain under the hauling machine or material handling machine.

17. A system for determining the compaction of a terrain of a worksite, the system comprising:
- at least one work machine configured to move along a route along over the terrain;
- a navigation system configured to generate route data indicative of the route;
- at least one sensor configured to generate operating parameter data indicative of at least one operating parameter of the at least one work machine moving along the route;
- at least one processing unit configured to:
  - process the operating parameter data to generate rolling resistance data indicative of the resistance by the terrain to the movement of the at least one work machine along the route; and
  - process the rolling resistance data to generate compaction data indicative of the compaction of the terrain along the route that has been passed over by the work machine as the work machine travels along the route, wherein the at least one work machine comprises a hauling machine or a material handling machine.

18. A system as claimed in claim 17, further comprising at least one surveying device configured to measure a surface profile of the worksite and generate surface profile data indicative of the measured surface profile.

* * * * *